(12) United States Patent
Araújo et al.

(10) Patent No.: US 11,935,267 B2
(45) Date of Patent: *Mar. 19, 2024

(54) HEAD-MOUNTED DISPLAY DEVICE AND METHOD THEREOF

(71) Applicant: Telefonaktiebolaget LM Ericsson (publ), Stockholm (SE)

(72) Inventors: José Araújo, Stockholm (SE); Soma Tayamon, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/836,080

(22) Filed: Jun. 9, 2022

(65) Prior Publication Data
US 2022/0301226 A1 Sep. 22, 2022

Related U.S. Application Data

(63) Continuation of application No. 16/954,723, filed as application No. PCT/EP2017/083600 on Dec. 19, 2017, now Pat. No. 11,380,018.

(51) Int. Cl.
*G06T 7/80* (2017.01)
*G02B 27/00* (2006.01)
(Continued)

(52) U.S. Cl.
CPC ............ *G06T 7/85* (2017.01); *G02B 27/0025* (2013.01); *G02B 27/0093* (2013.01); *G06T 7/74* (2017.01); *G02B 2027/0138* (2013.01)

(58) Field of Classification Search
CPC ........... G06T 7/85; G06T 7/74; G06T 19/006; G02B 27/0093; G02B 27/0176;
(Continued)

(56) References Cited

U.S. PATENT DOCUMENTS 6,711,293 B1    3/2004  Lowe
11,650,426 B2 * 5/2023  Zhang ................ G02B 27/0179
                                                              359/15
(Continued)

FOREIGN PATENT DOCUMENTS

CA        2130980 A1    2/1996
CN      111147834 A     5/2020
(Continued)

OTHER PUBLICATIONS

Grubert, Jens , et al., "A Survey of Calibration Methods for Optical See-Through Head-Mounted Displays", IEEE, Sep. 13, 2017, pp. 1-15.

(Continued)

*Primary Examiner* — Phuoc H Doan
(74) *Attorney, Agent, or Firm* — Murphy, Bilak & Homiller, PLLC

(57) ABSTRACT

A head-mounted display device (HMD) configured to be worn by a user is provided. The HMD comprises an at least partially see-through display, a front-facing camera operative to capture a first image of a real-world scene, and processing means which is operative to select a calibration object from one or more real-world objects, or parts thereof, which are visible in the first image, and derive a calibration transformation for calculating a display position based on a real-world position, such that a virtual object which is displayed on the display at the display position is aligned with a corresponding real-world object located at the real-world position, as seen by the user.

14 Claims, 4 Drawing Sheets

(51) Int. Cl.
*G06T 7/73* (2017.01)
*G02B 27/01* (2006.01)

(58) Field of Classification Search
CPC .. G02B 27/017; H02J 7/0052; H04L 12/1822; G06F 3/017; G06F 3/014; G06K 9/00664
See application file for complete search history.

(56) References Cited

U.S. PATENT DOCUMENTS

| | | |
|---|---|---|
| 2011/0254698 A1 | 10/2011 | Eberl et al. |
| 2013/0120224 A1 | 5/2013 | Cajigas et al. |
| 2013/0278631 A1 | 10/2013 | Border et al. |
| 2015/0035745 A1 | 2/2015 | Ou-Yang et al. |
| 2016/0117864 A1 | 4/2016 | Cajigas et al. |
| 2017/0061700 A1 | 3/2017 | Urbach et al. |
| 2017/0099481 A1 | 4/2017 | Held et al. |
| 2017/0147859 A1 | 5/2017 | Zhang et al. |
| 2017/0228878 A1 | 8/2017 | Goldman et al. |
| 2017/0295360 A1 | 10/2017 | Fu |
| 2020/0368616 A1 | 11/2020 | Delamont |

FOREIGN PATENT DOCUMENTS

| | | |
|---|---|---|
| CO | 95033117 A | 10/1996 |
| EP | 2994812 A1 | 3/2016 |
| IN | 202017023448 | 11/2020 |
| JP | 2012203823 A | 10/2012 |
| JP | 2017187667 A | 10/2017 |
| WO | 2013021458 A1 | 2/2013 |
| WO | 2013179427 A1 | 12/2013 |
| WO | 2015103623 A1 | 7/2015 |
| WO | 2016013634 A1 | 1/2016 |
| WO | 2016093750 A1 | 6/2016 |
| WO | 2016191043 A1 | 12/2016 |
| WO | 2017058495 A1 | 4/2017 |
| WO | 2018220631 A1 | 12/2018 |

OTHER PUBLICATIONS

Itoh, Yuta, et al., "Interaction-Free Calibration for Optical See-Through Head-Mounted Displays based on 3D Eye Localization", IEEE Symposium on 3D User Interfaces; Minneapolis, Minnesota, USA, Mar. 29-30, 2014, pp. 75-82.

Plopski, Alexander, et al., "Hybrid Eye Tracking: Combining Iris Contour and Corneal Imaging", International Conference on Artificial Reality and Telexistence Eurographics Symposium on Virtual Environments, 2015, pp. 1-8.

* cited by examiner

HEAD-MOUNTED DISPLAY DEVICE AND METHOD THEREOF

RELATED APPLICATIONS

This application is a continuation of U.S. application Ser. No. 16/954,723 filed 17 Jun. 2020, which is a U.S. National Phase Application of PCT/EP2017/083600 filed 19 Dec. 2017. The entire contents of each aforementioned application is incorporated herein by reference.

TECHNICAL FIELD

The invention relates to a head-mounted display device, a method performed by a head-mounted display device, a corresponding computer program, and a corresponding computer-readable storage medium.

BACKGROUND

Mixed reality (MR) is foreseen to become an integral technology in the networked society and potently disrupt the consumer electronics market. Mixed reality encompasses Augmented Reality (AR) and Augmented Virtuality (AV).

AR is oftentimes performed via handheld devices, such as smartphones and tablets, or via Head-Mounted Displays (HMD) (also known as Head-Mounted Display Devices) such as Microsoft HoloLens. AR via an HMD implies layering information such as text, images, or videos, on top of the user's view of the real world via a see-through display.

Display devices with see-through displays, such as HMDs, require calibration in order to provide an immersive user experience. The objective of calibration is to be able to display virtual objects, such as text, images, and videos, on the see-through display of the HMD such that the displayed virtual objects are correctly aligned with real-world objects seen by the user through the see-through display. In practice, the user's eye pose must be known, in addition to the pose of the display and the respective pose of any camera comprised in the HMD, such as a front-facing camera for capturing images of the real-world and/or tracking real-world objects, and an eye-facing camera for tracking the user's eyes.

An overview of known calibration methods for HMDs has been given by J. Grubert. Y. Itoh, K. Moser, and J. E. Swan II ("A Survey of Calibration Methods for Optical See-Through Head-Mounted Displays", arXiv: 1709.04299v1, 13 Sep. 2017). Such calibration methods are typically performed manually when the HMD is in use, while some of the calibration methods can be automated. Common to some known calibration methods is that they rely on non-practical calibration rigs and/or expensive calibration equipment.

For instance, a manual calibration procedure for establishing a view matrix that is calibrated to the user's specific eye characteristics is disclosed in WO 2016/191043 A1.

Also known are calibration methods based on corneal imaging, relying on an eye-facing camera for imaging a reflection of the real-world scene by the user's cornea, as described in "Hybrid Eye Tracking: Combining Iris Contour and Corneal Imaging", by A. Plopski, C. Nitschke, K. Kiyokawa, D. Schmalstieg, and H. Takemura, International Conference on Artificial Reality and Telexistence Eurographics Symposium on Virtual Environments, The Eurographics Association, 2015).

SUMMARY

It is an object of the invention to provide an improved alternative to the above techniques and prior art.

More specifically, it is an object of the invention to provide improved solutions for calibrating a see-through head-mounted display device. In particular, it is an objective of the invention to provide solutions for automatically selecting a calibration object for use in a calibration procedure.

These and other objects of the invention are achieved by means of different aspects of the invention, as defined by the independent claims. Embodiments of the invention are characterized by the dependent claims.

According to a first aspect of the invention, a head-mounted display device is provided. The display device is configured to be worn by a user and comprises an at least partially see-through display, a front-facing camera, and processing means. The front-facing camera is operative to capture a first image of a real-world scene. Typically, when worn by the user, the captured real-world scene is the scene in front of the user. The processing means is operative to select a calibration object from one or more real-world objects, or parts thereof, which are visible in the first image. The processing means is further operative to derive a calibration transformation for calculating a display position based on a real-world position, such that a virtual object which is displayed on the display at the display position is aligned with a corresponding real-world object located at the real-world position, as seen by the user. The calibration transformation may, e.g., be represented by a matrix or other form of mathematical representation which is suitable for describing a transformation between two coordinate systems.

According to a second aspect of the invention, a method performed by a head-mounted display device is provided. The display device is configured to be worn by a user. The method comprises selecting a calibration object from one or more real-world objects, or parts thereof, which are visible in a first image of a real-world scene. The first image is captured by a front-facing camera comprised in the display device. The method further comprises deriving a calibration transformation for calculating a display position based on a real-world position, such that a virtual object which is displayed at the display position on an at least partially see-through display is aligned with a corresponding real-world object located at the real-world position, as seen by the user. The at least partially see-through display is comprised in the display device.

According to a third aspect of the invention, a computer program is provided. The computer program comprises computer-executable instructions for causing a head-mounted display device to perform the method according to an embodiment of the second aspect of the invention, when the computer-executable instructions are executed on a processing unit comprised in the display device.

According to a fourth aspect of the invention, a computer-readable storage medium is provided. The computer-readable storage medium has the computer program according to the third aspect of the invention stored thereon.

The invention makes use of an understanding that an improved calibration procedure for see-through Head-Mounted Displays or Display Devices (HMDs) is achieved by automatically selecting of a calibration object among one or more real-world objects for use in a calibration procedure. e.g., any of the calibration procedures which are known in the art. Thereby, the user of an HMD is alleviated from keeping, or carrying, a dedicated calibration object. Embodiments of the invention select a suitable calibration object among one or more real-world objects, i.e., physical objects in the surrounding of the user which are visible in the first image which is captured by the front-facing camera. These are real-world objects which are in the field-of-view of the front-facing camera, such as furniture, household appliances, buildings, doors, windows, vehicles, street signs, tablets, smartphones, laptops, checkerboards, and so forth.

According to an embodiment of the invention, the display device further comprises an eye-facing camera which is operative to capture a second image of a reflection of the real-world scene by a cornea of the user. The processing means is operative to select the calibration object from one or more real-world objects, or parts thereof, which are visible in both the first image and the second image, and to derive the calibration transformation using the first image and the second image. This embodiment of the invention relates to calibration methods which rely on corneal imaging. Optionally, the calibration object is selected from one or more real-world objects, or parts thereof, which are visible in a region of the first image which corresponds to a field-of-view of the eye-facing camera. Typically, the field of view of the eye-facing camera is smaller than that of the front-facing camera. Since the calibration object needs to be visible in both the first image and the second image, in order to derive the calibration transformation as part of a calibration procedure relying on corneal imaging, the calibration object is advantageously selected among the real-world objects which are visible in a part of the first image which corresponds to the field-of-view of the eye-facing camera. In practice, these are objects which are also visible in the second image captured by the eye-facing camera. Advantageously, since the first image (captured by the front-facing camera) is typically superior to the second image (captured by the eye-facing camera), owing to the imperfections of the cornea, identifying real-world objects by image processing the first image is easier, more reliable, and less resource consuming, as compared to the second image.

According to an embodiment of the invention, the calibration object may be selected based on a distortion of the calibration object in the second image as compared to the first image. This is the case if a calibration method which relies on corneal imaging is employed. Preferably, the object with least distortion is selected. This is advantageous as the calibration transformation is derived by comparing the same object as captured by the first and the second image.

According to an embodiment of the invention, the calibration object is selected based on a visual appearance of the calibration object. For instance, real-world objects which are clearly visible and/or have high contrast, and which accordingly are easy to detect by image processing or object recognition, are preferably selected.

According to an embodiment of the invention, a previously selected calibration object among the one or more real-world objects is selected as the calibration object. This may be achieved by maintaining a database of used calibration objects.

According to an embodiment of the invention, the display device comprises one or more motion sensors which are operative to track a motion of the display device. The processing means is operative to estimate a duration of time during which the one or more real-world objects remain visible in the first image, and select the calibration object based on the estimated duration of time during which the calibration object remains visible in the first image. The duration of time during which the one or more real-world objects are visible in the first image is estimated based on the tracked motion of the display device. Preferably, a real-world object is selected which is visible in the first image, and optionally in the second image, for a duration of time sufficiently long to perform the calibration procedure. As an alternative, a real-world object which is moving slowly, or not moving at all, relative to the field-of-view, may be selected.

According to an embodiment of the invention, the calibration object is selected by identifying one or more real-world objects by matching visual features of the one or more real-world objects against information pertaining to visual features of real-world objects which is stored in a database, and selecting the calibration object based on information obtained from the database. The information obtained from the database may indicate a respective suitability of the identified real-world objects, or parts thereof, as calibration object. The information may, e.g., relate to visual appearance, dimensions, composition of the real-world object in terms of geometrical shapes, or the like. In this respect, a real-world object is considered more suitable as calibration object if its visual appearance is characterized by a high contrast or by geometrical shapes which are easy to detect by image processing. For instance, a checkerboard is characterized by being composed of simple geometrical shapes and by high contrast. Preferably, the most suitable calibration object is selected.

According to an embodiment of the invention, the display device further comprises a wireless-communications interface. The processing means is operative to select the calibration object by identifying, using the wireless-communications interface, a communications device comprising a display among the one or more real-world objects, and selecting as the calibration object at least one of the display of the communications device and graphical content displayed thereon. Communications device comprising a display may, e.g., be identified by establishing wireless communications with nearby communications devices, by querying the type, capabilities, or make/model, of the nearby communications devices. Advantageously, a nearby communications device which is in the field-of-view of the front-facing camera may display graphical content in the form of a dedicated calibration pattern which is characterized by high contrast and which is composed of simple geometrical shapes, such as rectangles, squares, circles, or the like. Optionally, the display device may receive a representation of the displayed graphical content from the communications device via the wireless-communications interface. In other words, the communications device may report to the display device what graphical content is currently displayed, such that the display device may use the displayed graphical content as calibration object. As an alternative, the display device may transmit an instruction to the communications device via the wireless-communications interface, to display the graphical content on the display of the communications device. The instruction may be a request, such as a message or signal, in response to which the communications device displays the graphical content. Optionally, the display device may transmit a representation of the graphical content to the communications device via the wireless-communications interface.

According to an embodiment of the invention, the display device is further operative to receive an instruction to display a virtual object, the instruction comprising a corresponding real-world position of the virtual object when being displayed to the user. This is the position in the real-world scene where the virtual object appears to be placed. The instruction may, e.g., be received from an AR application which is executed by the display device, or which utilizes the display device for displaying virtual objects to the user. The display device is further operative to calculate a display position of the virtual object by applying the calibration transformation to the received real-world position, and display the virtual object at the calculated display position on the display.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings, and the appended claims. Those skilled in the art realize that different features of the invention can be combined to create embodiments other than those described in the following.

BRIEF DESCRIPTION OF THE DRAWINGS

The above, as well as additional objects, features, and advantages, of the invention, will be better understood through the following illustrative and non-limiting detailed description of embodiments of the invention, with reference to the appended drawings, in which.

Figure 1:
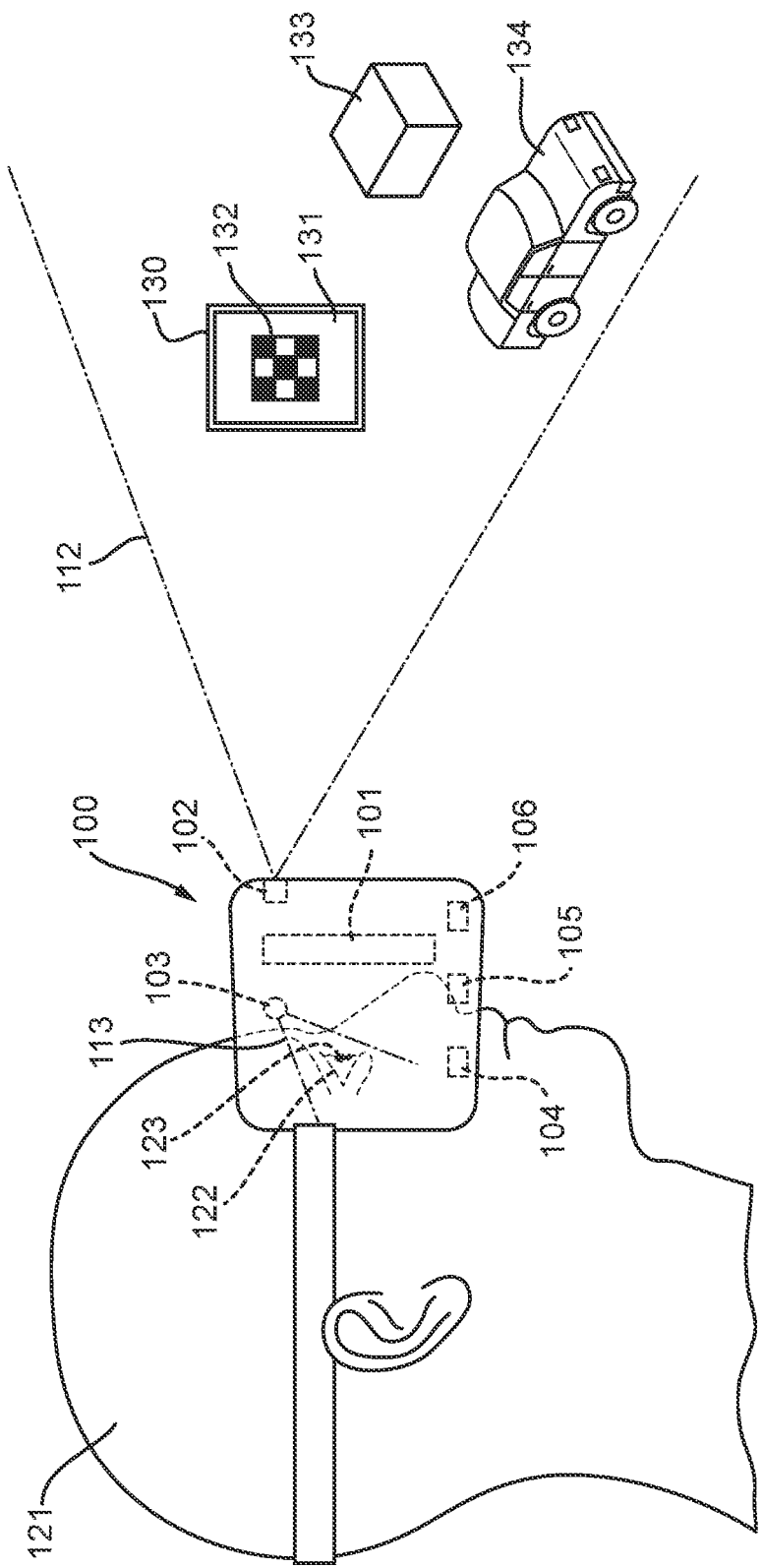
FIG. 1 shows a head-mounted display device, in accordance with embodiments of the invention.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

In the following, embodiments of the Head-Mounted Display Device (HMD) are described with reference to FIG. 1, which shows an HMD 100 configured to be worn by a user. HMD 100 may, e.g., be attached to a head 121 of the user using straps, or the like. HMD 100 comprises an at least partially see-through display 101 through which the user can view a real-world scene which is in front of the user, using eyes 122. Display 101 may be used for displaying virtual objects, such as text, images, videos, or other types of graphical content, to the user, such that the displayed virtual objects are overlaid onto the real-world scene. HMD 100 further comprises a front-facing camera 102 which is operative to capture a first image of the real-world scene, and processing means 104 which is operative to cause HMD 100 to perform in accordance with embodiments of the invention set forth herein.

More specifically. HMD 100 is operative to select a calibration object from one or more real-world objects, or parts thereof, 130-135 which are visible in the first image captured by front-facing camera 102. The first image represents a view of the real-world scene which is within a field-of-view 112 of front-facing camera 102. In the present context, a real-world object may be any physical object, such as a piece of furniture, a household appliance, a building, a door, a window, a vehicle, a street sign, a tablet, a smartphone, a laptop, a checkerboard, and so forth. In FIG. 1, a few real-world objects are exemplified as a tablet 130, a box 133, and a car 134. Embodiments of the invention may select an entire real-world object as calibration object such as, e.g., box 133, or a part of a real-world object, such as, e.g., a display 131 of tablet 130, or graphical content 132 displayed thereon. In FIG. 1, graphical content 132 is exemplified as a checkerboard, which is a commonly used calibration pattern in the field, owing to its high contrast and composition with simple geometrical shapes, which facilitates image processing and object recognition.

HMD 100 is further operative to derive a calibration transformation for calculating a display position based on a real-world position. The display position is calculated such that a virtual object which is displayed on display 101 at the display position, relative to a coordinate system of display 101, is aligned with a corresponding real-world object 101 located at the real-world position, relative to a coordinate system of front-facing camera 102, as seen by the user when viewing the real-world scene with his/her eyes 122 through display 101.

In AR relying on see-through displays, such as HMD 100, an important task is to calibrate the HMD in order to establish the relative orientation and position. i.e., the pose, of the different coordinate systems. For the purpose of elucidating the invention, several coordinate systems may be associated with HMD 100. A first coordinate system may be associated with display 101, a second coordinate system may be associated with front-facing camera 102, a third coordinate system may be associated with an optional eye-facing camera 103 (described further below), and a fourth coordinate system may be associated with eyes 122 of the user. Only if properly calibrated, a virtual object can be displayed on display 101 such that it appears to be placed at a desired position in the real-world scene, enabling an immersive user experience. The issue at hand is outlined, and a manual calibration procedure proposed, in WO 2016/191043 A1. An overview of different calibration procedures can be found in "A Survey of Calibration Methods for Optical See-Through Head-Mounted Displays", by J. Grubert, Y. Itoh, K. Moser, and J. E. Swan II (arXiv: 1709.04299v1, 13 Sep. 2017).

Figure 2:
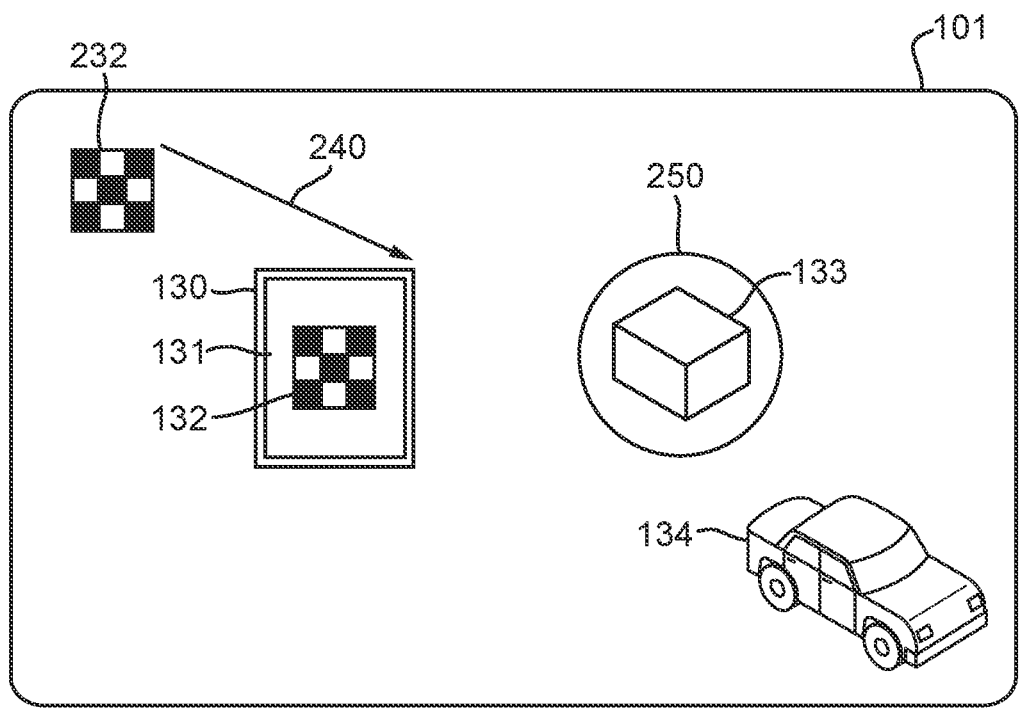
FIG. 2 shows a view through the at least partially see-through display of the display device of FIG. 1, in accordance with embodiments of the invention.

Overlaying a virtual object onto the real-world scene is illustrated in FIG. 2, which shows the view of the real-world scene as seen by the user, with eyes 122, through display 101. In FIG. 2, real-world objects, or parts thereof, 130-135 are seen through display 101, whereas virtual object 232, here illustrated as a checkerboard which is identical to checkerboard 132 displayed as graphical content on display 131 of tablet 130, is overlaid onto the real-world scene by displaying it on display 101. Under the assumption that checkerboard 232 is to be displayed at a display position such that it appears to be placed at the real-world position of checkerboard 132 which is displayed on display 131 of tablet 130, HMD 100 needs to correct the display position so as to displace checkboard 232 such that it is aligned with, i.e., overlaps, checkerboard 132 displayed on tablet 130, as seen by eyes 122. The required displacement of checkerboard 232, which in FIG. 2 is illustrated by arrow 240, is the objective of a calibration procedure.

HMD 100 may optionally comprise an eye-facing camera 103 which is operative to capture a second image of a reflection of the real-world scene by a cornea 123 of the user. Corneal imaging is a technique which utilizes a camera for imaging a person's cornea, in particular that of the user of the HMD, for gathering information about what is in front of the person and also, owing to the spherical nature of the human eyeball, for gathering information about objects in a field-of-view which potentially is wider than the viewing field-of-view. Such objects may potentially be outside the camera's field-of-view and even be located behind the camera. The technique is made possible due to the highly reflective nature of the human cornea, and also the availability of high-definition cameras in consumer devices such as HMDs.

If the calibration procedure relies on corneal imaging. HMD 100 is operative to select the calibration object from one or more real-world objects, or parts thereof, 130-135 which are visible in both the first image and the second image, and to derive the calibration transformation using the first image and the second image. Further optionally, HMD 100 may be operative to select the calibration object from one or more real-world objects, or parts thereof, 130-135 which are visible in a region of the first image which corresponds to field-of-view 113 of eye-facing camera 103. Since the first image (captured by front-facing camera 102 with field-of-view 112) is typically superior to the second image (captured by eye-facing camera 103 with field-of-view 113), owing to the reflection off the imperfect surface of cornea 123, identifying real-world objects by image processing and object recognition is easier, more reliable, and less resource consuming, using the first image as compared to the second image. By limiting the region of the first image which needs to be processed for identifying real-world objects which are suitable as calibration objects, embodiments of the invention require less computing resources and accordingly less power.

The calibration procedure itself, i.e., establishing the relative pose of the different coordinate systems associated with an HMD, is outside the scope of this disclosure. It suffices to say that a real-world calibration object is used for deriving the calibration transformation, e.g., a matrix or any other form of mathematical representation which is suitable for describing a transformation of coordinates between two coordinate systems. It will be appreciated that, depending on the design of the HMD, one or more of the coordinate systems may have fixed poses relative to each other and/or HMD 100. For instance, this is the case for HMDs in which display 101, front-facing camera 102, and optionally eye-facing camera 103, are contained in a single unit, such that the different components cannot move relative to each other during normal use.

The calibration objects which are used in the art are typically dedicated calibration objects, such as a checkerboard or a calibration rig (see, e.g., "Hybrid Eye Tracking: Combining Iris Contour and Corneal Imaging", by A. Plopski, C. Nitschke. K. Kiyokawa, D. Schmalstieg, and H. Takemura. International Conference on Artificial Reality and Telexistence Eurographics Symposium on Virtual Environments, The Eurographics Association, 2015). Rather than using a dedicated calibration object which the user of HMD 100 has to keep, and possibly carry with him/her, embodiments of the invention rely on utilizing a real-world object which is available in the vicinity of the user when HMD 100 requires calibration. Depending on the design of an HMD and its usage, calibration is typically required if the pose of eyes 122 has changed, i.e., the orientation and/or position of eyes 122 relative to HMD 100. Moreover, calibration may be required if one or more of display 101, front-facing camera 102, and eye-facing camera 103, have been displaced relative to each other and/or relative to HMD 100.

More specifically. HMD 100 may be operative to initiate, or trigger, a calibration procedure. i.e., to select the calibration object and to derive the calibration transformation, in response to any one of: receiving from the user an instruction to initiate a calibration procedure, powering up HMD 100, detecting a misalignment of a displayed virtual object relative to the real-world scene, detecting that the user is different from a previous user of HMD 100, detecting that HMD 100 has been displaced relative to at least one eye 122 of the user, and detecting that one or more of display 101, front-facing camera 102, and eye-facing camera 103, have been displaced relative to each other and/or relative to HMD 100.

In practice, a misalignment of a displayed virtual object relative to the real-world scene may be detected by displaying a virtual object at a display position which corresponds to the real-world position of a specific real-world object. In particular, the displayed virtual object may have the same shape as the real-world object, i.e., it may be a virtual representation (or virtual copy) of the real-world object. If the displayed virtual object and the real-world object are misaligned, at least to a certain extent, the calibration procedure is triggered. The misalignment can either be detected by the user or through corneal imaging, by image processing the second image captured by eye-facing camera 103, in which both the real-world object and the overlaid virtual object are visible.

A displacement of HMD 100 relative to at least one eye 122 of the user may, e.g., be detected using eye-facing camera 103. This may be achieved by tracking the position(s) of the eye(s) 122 of the user over time. The calibration procedure is triggered if the position of the user's eye(s) 122 deviates from a historical average value by more than a threshold value. The threshold value may either be set by the user, by a manufacturer of HMD 100, or by an AR application utilizing HMD 100 for displaying virtual objects to the user.

A displacement of one or more of display 101, front-facing camera 102, and eye-facing camera 103, relative to each other and/or relative to HMD 100 may be detected by utilizing motion sensors which are comprised in display 101, front-facing camera 102, and eye-facing camera 103.

In the following, different alternatives for selecting the calibration object among one or more real-world objects, or parts thereof, 130-135 are described.

For instance, HMD 100 may be operative to select the calibration object based on a visual appearance of the calibration object. Preferably, real-world objects which are clearly visible, have good lighting conditions and/or high contrast, and/or are composed of simple geometrical shapes, are selected. Such real-world objects are typically easy to detect by image processing and object recognition. e.g., using Scale-Invariant Feature Transform (SIFT) (see, e.g., U.S. Pat. No. 6,711,293 B1) or similar algorithms known in the art.

Alternatively, HMD 100 may be operative to select as the calibration object a previously selected calibration object among the one or more real-world objects, or parts thereof, 130-135. For this purpose. HMD 100 may maintain a database, either in a memory comprised in HMD 100 (such as memory 303 show in FIG. 3) or accessible by HMD 100 over a communications network (via wireless-communications interface 105). e.g., a cloud-based database. In the database, information which may be used for identifying a calibration object among the one or more real-world objects may be stored, e.g., information pertaining to their visual appearance or visual features, pictures, or information pertaining to their shape, composition of geometrical shapes, and dimensions.

As a further alternative. HMD 100 may additionally comprise one or more motion sensors 106 operative to track a motion of HMD 100. The one or more motion sensors 106 may, e.g., be based on accelerometers, gyroscopes. Global Positioning System (GPS) sensors, magnetometers, cameras, and so forth, as are known in the art and provided with regular smartphones. HMD 100 is operative to estimate a duration of time during which the one or more real-world objects remain visible in the first image, i.e., remain within field-of-view 112 of front-facing camera 102, based on the tracked motion of HMD 100, and select the calibration object based on the estimated duration of time during which the calibration object remains visible in the first image. This is the case if a calibration procedure is employed by HMD 100 which relies on tracking the selected calibration object with front-facing camera 102. Preferably, a real-world object, or part thereof, 130-135 is selected as calibration object which is visible in the first image for a duration of time sufficiently long to perform the calibration. As an alternative, a real-world object, or part thereof, 130-135 which is moving slowly, or not moving at all, relative to field-of-view 102 may be selected as calibration object. For instance, if HMD 100 is more or less stationary, a stationary real-world object such as box 133 may be selected. If, on the other hand, HMD 100 is moving, e.g., because the user is turning his/her head 121, a real-world object which is moving similarly may be selected, such as car 134.

It will also be appreciated that, if the calibration object is selected among the one or more real-world objects, or parts thereof, 130-135 which are visible in a region of the first image which corresponds to field-of-view 113 of eye-facing camera 103, the calibration object may be selected based on an estimated duration of time during which the calibration object remains visible in the second image, i.e., within field-of-view 113 of eye-facing camera 103.

As yet a further alternative, HMD 100 may be operative to select the calibration object by identifying one or more real-world objects 130-135 by matching visual features of one or more real-world objects 130-135 against information pertaining to visual features of real-world objects which is stored in a database, e.g., using SIFT or similar algorithms, and selecting the calibration object based on information obtained from the database. The obtained information may indicate a respective suitability of the identified real-world objects, or parts thereof, 130-135 as calibration object. For instance, the information may relate to visual appearance, shape, composition of geometrical shapes, dimensions, or the like, which is utilized in deriving the calibration transformation. Preferably, the most suitable calibration object is selected.

As yet a further alternative, if the calibration transformation is derived using both the first image and the second image, by relying on corneal imaging, HMD 100 may be operative to select the calibration object based on a distortion of the calibration object in the second image as compared to the first image. A distortion of the calibration object in the second image may stem from the reflection off cornea 123, which is spherical shape and may suffer from imperfections in the outer surface of cornea 123 and tears or dirt on the outer surface of cornea 123. In addition, the optical element of HMD 100, through which the user views the real-world scene, may contribute to the distortion of the second image. Preferably, the object with the least distortion is selected to facilitate deriving the calibration transformation.

Embodiments of the invention may also select as the calibration object a communications device among the one or more real-world objects, such as tablet 130 shown in FIGS. 1 and 2, a smartphone, a mobile phone, a computer display, a television, or the like. To this end, HMD 100 may comprise a wireless-communications interface 105, which may be based on any known wireless communications technology. For example, wireless-communications interface 105 may be based on a short-range radio technology like Wireless Local Arena Network (WLAN)/WiFi or Bluetooth, or a cellular radio technology like Global System for Mobile communications (GSM). Universal Mobile Telecommunications System (UMTS). Long Term Evolution (LTE), or a 5G technology based on NR/NX. Communications. i.e., exchange of data, between HMD 100 and the communications device, comprising a wireless-communications interface which is compatible with wireless-communications interface 105, may commence using any suitable protocol. e.g., the HyperText Transfer Protocol (HTTP), the Constrained Application Protocol (CoAP), or the like.

More specifically, HMD 100 is operative to select the calibration object by identifying, using wireless-communications interface 105, a communications device comprising a display among the one or more real-world objects, such as tablet 130, and selecting as the calibration object at least one of display 131 of tablet 130 and graphical content 132 displayed thereon. Identifying a wireless-communications devices among the one or more real-world objects may, e.g., be achieved by relying on a discovery procedure as is known from Bluetooth and other wireless-communications technologies. As part of the discovery procedure, or subsequent to the discovery procedure, HMD 100 may be operative to establish wireless communications with the identified communications device and/or to acquire information about a type of the communications device or its capabilities, in particular information pertaining to its display 131. Utilizing a communications device with a display, such as tablet 130, as calibration object is advantageous in that a display is typically easy to identify by image processing and object recognition, owing to its simple geometrical shape and high contrast, if sufficiently bright.

A further advantage of using a communications device comprising a display as calibration object is that information pertaining to graphical content which is displayed on the display of the communications device during the calibration procedure may be exchanged between HMD 100 and the communications device. The displayed graphical content may, e.g., be a dedicated calibration pattern which is characterized by high contrast and is composed of simple geometrical shapes (rectangles, squares, circles), such as checkerboard 132 shown in FIGS. 1 and 2.

More specifically, HMD 100 may be operative to receive a representation of displayed graphical content 132 from tablet 130 via wireless-communications interface 105. That is, tablet 130 reports what is currently displayed on display 131. The displayed graphical content may be any graphical content which currently is displayed by one or more apps (applications) being executed by tablet 130, but may advantageously be a dedicated calibration pattern, such as checkerboard 132. Tablet 130 may, e.g., be operative to display a dedicated calibration pattern in response to establishing communications with HMD 100, or in response to receiving an indication from HMD 100 that calibration is ongoing.

As an alternative, HMD 100 may be operative to transmit an instruction to tablet 130 via wireless-communications interface 105, to display graphical content 132 on display 131. The instruction may, e.g., be a request, a message, or a signal, in response to which tablet 130 displays graphical content 132. The displayed graphical content may be predefined, such as a dedicated calibration pattern. Optionally. HMD 100 may be operative to transmit a representation of graphical content 132 to tablet 130 via wireless-communications interface 105. In this way, HMD 100 may control the details of the graphical content which is displayed by tablet 132, and may advantageously transmit a dedicated calibration pattern to tablet 132. The representation of the graphical content may, e.g., be in the form of a known computer-graphics format or image format.

HMD 100 may further be operative, in response to selecting the calibration object, to adapt one or more displayed virtual objects which overlap the selected calibration object, as seen by the user with eyes 122. This is particularly advantageous if a calibration method based on corneal imaging is employed, e.g., as described in "Hybrid Eye Tracking: Combining Iris Contour and Corneal Imaging", by A. Plopski, C. Nitschke, K. Kiyokawa, D. Schmalstieg, and H. Takemura, International Conference on Artificial Reality and Telexistence Eurographics Symposium on Virtual Environments. The Eurographics Association, 2015). Thereby, it is avoided that the calibration object is obscured by a displayed virtual object, which may inhibit the calibration procedure.

HMD 100 may further be operative, in response to selecting the calibration object, to notify the user that calibration is ongoing. Optionally. HMD 100 may be operative to notify the user that calibration is ongoing by displaying a marker 250 on display 101 to identify the selected calibration object, in this case box 133, to the user. Thereby, the user may be requested to gaze in the direction of the selected calibration object, or to adapt his/her movement so as to facilitate the calibration procedure. The user may alternatively be requested to change his/her head pose so as to minimize a distortion of the selected calibration object in the second image, if a calibration procedure relying on corneal imaging is used, or to move closer to the selected calibration cerebration object.

Once the calibration transformation has been derived, a representation of the derived calibration transformation, such as a matrix or other suitable mathematical representation in electronic format, may be stored in a memory of HMD 100 (such as memory 303 shown in FIG. 3) and subsequently used for displaying virtual objects in a manner which provides an immersive user experience. To this end. HMD 100 may be operative to receive an instruction to display a virtual object. The instruction may, e.g., be received from an AR application which is executed by HMD 100, or from an AR application which utilizes HMD 100 for displaying virtual objects to the user. For instance. HMD 100 may be connected, either wired or wirelessly using any suitable protocol. e.g., HTTP or CoAP, to a computing device such as a computer, a laptop, a smartphone, a tablet, or a gaming console, executing the AR application. The received instruction comprises a corresponding real-world position of the virtual object when being displayed to the user. i.e., a position in the real world at which the virtual object appears to be placed when being displayed to the user (seen with eyes 122) on display 101. HMD 100 is further operative to calculate a display position of the virtual object by applying the calibration transformation to the received real-world position, and to display the virtual object at the calculated display position on display 101.

In the following, embodiments of processing means 104 comprised in HMD 100 are described with reference to FIGS. 3 and 4.

Figure 3:
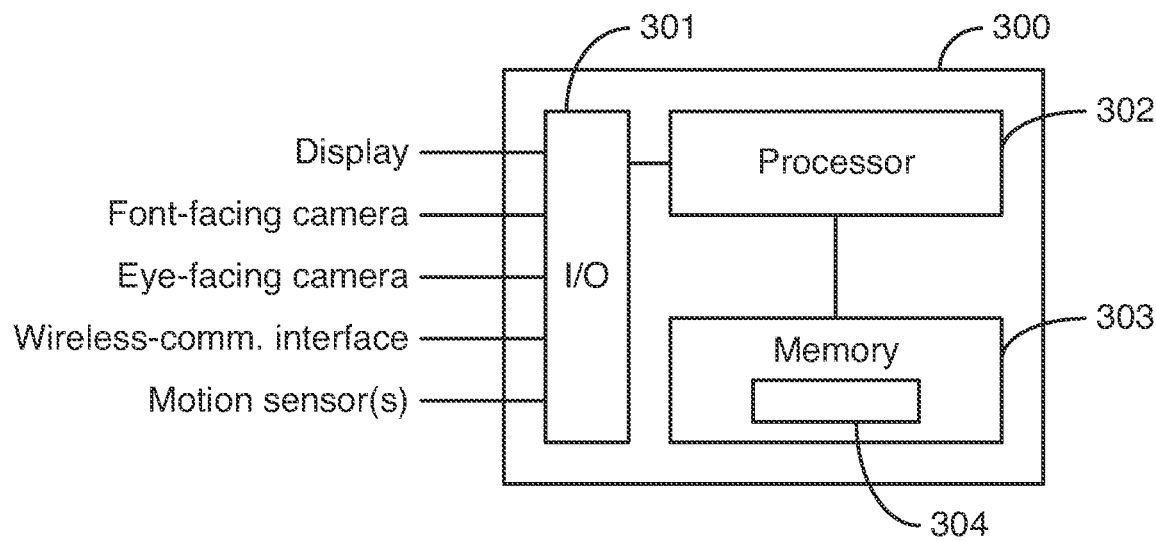
FIG. 3 shows an embodiment of the processing means comprised in the display device of FIG. 1.

An embodiment 300 of processing means 104 is shown in FIG. 3. Processing means 300 comprises a processing unit 302, such as a general-purpose processor or processing circuitry, and a computer-readable storage medium 303, such as a Random-Access Memory (RAM), a Flash memory, or the like. In addition, processing means 300 comprises one or more interfaces 301 ("I/O" in FIG. 3) for controlling and/or receiving information from other components comprised in HMD 100, such as display 101, front-facing camera 102, eye-facing camera 103, wireless-communications interface 105, and one or more motion sensors 106, some of which may be optional. Memory 303 contains computer-executable instructions 304, i.e., a computer program or software, to cause HMD 100 to become operative in accordance with embodiments of the invention as described herein, when computer-executable instructions 304 are executed on processing unit 302.

Figure 4:
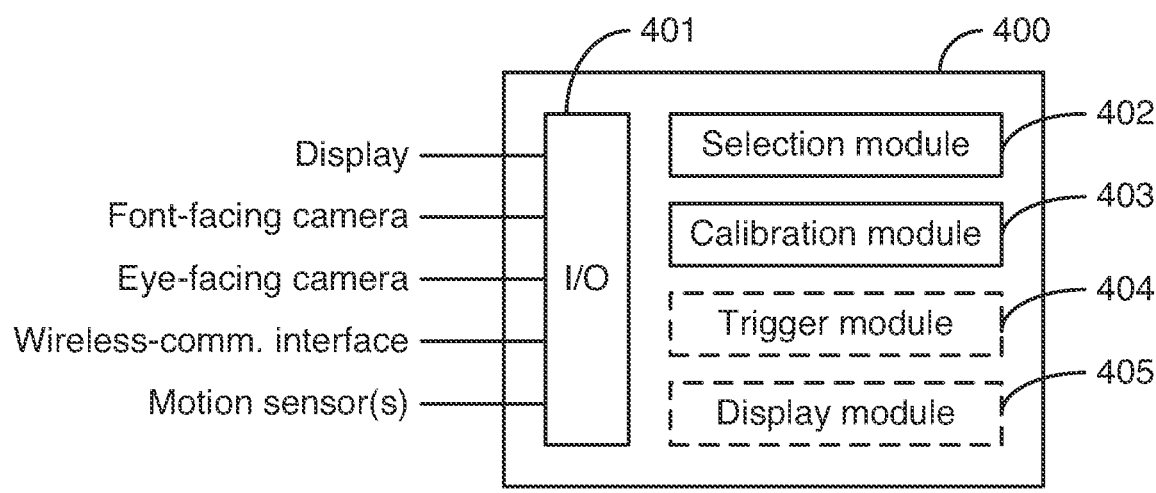
FIG. 4 shows another embodiment of the processing means comprised in the display device of FIG. 1.

An alternative embodiment 400 of processing means 104 is illustrated in FIG. 4. Similar to processing means 300, processing means 400 comprises one or more interfaces 401 ("I/O" in FIG. 4) for controlling and/or receiving information from other components comprised in HMD 100, such as display 101, front-facing camera 102, eye-facing camera 103, wireless-communications interface 105, and one or more motion sensors 106, some of which may be optional. Processing means 400 further comprises a selection module 402, a calibration module 403, an optional trigger module 404, and an optional display module 405, which are configured to cause HMD 100 to become operative in accordance with embodiments of the invention as described herein.

In particular, selection module 402 is configured to select a calibration object from one or more real-world objects, or parts thereof, which are visible in a first image of a real-world scene, which first image captured by a front-facing camera comprised in the display device. Calibration module 403 is configured to derive a calibration transformation for calculating a display position based on a real-world position, such that a virtual object which is displayed at the display position on an at least partially see-through display which is comprised in the display device is aligned with a corresponding real-world object located at the real-world position, as seen by the user.

For instance, selection module 402 may be configured to select the calibration object from one or more real-world objects, or parts thereof, which are visible in both the first image and a second image of a reflection of the real-world scene by a cornea of the user, which second image is captured by an eye-facing camera comprised in the display device. Calibration module 403 may be configured to derive the calibration transformation using the first image and the second image.

Alternatively, selection module 402 may be configured to select the calibration object from one or more real-world objects, or parts thereof, which are visible in a region of the first image which corresponds to a field-of-view of the eye-facing camera.

As another alternative, selection module 402 may be configured to select the calibration object based on a distortion of the calibration object in the second image as compared to the first image.

As a further alternative, selection module 402 may be configured to select the calibration object based on a visual appearance of the calibration object.

As yet a further alternative, selection module 402 may be configured to select a previously selected calibration object among the one or more real-world objects as the calibration object.

As yet a further alternative, selection module 402 may further be configured to track a motion of the display device using one or more motion sensors comprised in the display device, estimate, based on the tracked motion of the display device, a duration of time during which the one or more real-world objects remain visible in the first image, and select the calibration object based on the estimated duration of time during which the calibration object remains visible in the first image.

As yet a further alternative, selection module 402 may be configured to select the calibration object by identifying one or more real-world objects by matching visual features of the one or more real-world objects against information pertaining to visual features of real-world objects which is stored in a database, and selecting the calibration object based on information obtained from the database, which information indicates a respective suitability of the identified real-world objects, or parts thereof, as calibration object.

As yet a further alternative, selection module 402 may be configured to select the calibration object by identifying, using a wireless-communications interface comprised in the display device, a communications device comprising a display among the one or more real-world objects, and selecting as the calibration object at least one of the display of the communications device and graphical content displayed thereon. Optionally, selection module 402 may further be configured to receive a representation of the displayed graphical content from the communications device via the wireless-communications interface. Alternatively, selection module 402 may further be configured to transmit an instruction to the communications device via the wireless-communications interface, to display the graphical content on the display of the communications device. Optionally, selection module 402 may further be configured to transmit a representation of the graphical content to the communications device via the wireless-communications interface.

Optional trigger module 404 may be configured to trigger selecting the calibration object by selection module 402 and deriving the calibration transformation by calibration module 403 in response to any one of: receiving from the user an instruction to initiate a calibration procedure, powering up the display device, detecting a misalignment of a displayed virtual object relative to the real-world scene, detecting that the user is different from a previous user of the display device, detecting that the display device has been displaced relative to at least one eye of the user, and detecting that any one of display 101, front-facing camera 102, and eye-facing camera 102, has been displaced relative to the display device.

Optional display module 405 may be configured, in response to selecting the calibration object by selection module 402, to adapt one or more displayed virtual objects which overlap the selected calibration object as seen by the user.

Optionally, selection module 402 may further be configured, in response to selecting the calibration object, to notify the user that calibration is ongoing. Optionally, the user is notified that calibration is ongoing by displaying a marker on the display to identify the selected calibration object to the user.

Optional display module 405 may further be configured to receive an instruction to display a virtual object, the instruction comprising a corresponding real-world position of the virtual object when being displayed to the user, calculate a display position of the virtual object by applying the calibration transformation derived by calibration module 403 to the received real-world position, and display the virtual object at the calculated display position on the display.

Modules 402-405 comprised in processing mean 400 may further be configured to perform additional or alternative operations in accordance with embodiments of the invention, as described herein.

Interfaces 301 and 401, and modules 402-405, as well as any additional modules comprised in processing means 400, may be implemented by any kind of electronic circuitry, e.g., any one, or a combination of, analogue electronic circuitry, digital electronic circuitry, and processing means executing a suitable computer program. i.e., software.

Figure 5:
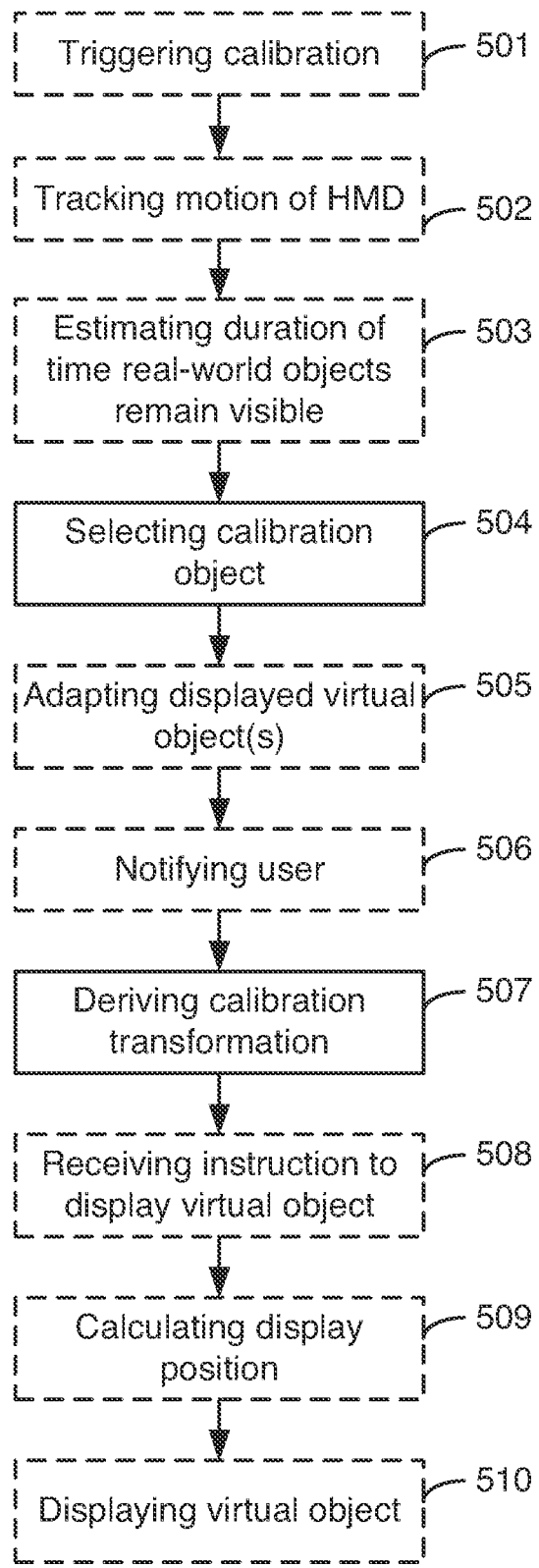
FIG. 5 shows a flowchart illustrating a method performed by a head-mounted display device, in accordance with embodiments of the invention.

In the following, embodiments 500 of the method performed by a head-mounted display device which is configured to be worn by a user are described with reference to FIG. 5.

Method 500 comprises selecting 504 a calibration object from one or more real-world objects, or parts thereof, which are visible in a first image of a real-world scene, which first image captured by a front-facing camera comprised in the display device, and deriving 507 a calibration transformation for calculating a display position based on a real-world position, such that a virtual object which is displayed at the display position on an at least partially see-through display which is comprised in the display device is aligned with a corresponding real-world object located at the real-world position, as seen by the user.

For instance, the calibration object may be selected 504 from one or more real-world objects, or parts thereof, which are visible in both the first image and a second image of a reflection of the real-world scene by a cornea of the user, which second image is captured by an eye-facing camera comprised in the display device, and the calibration transformation may be derived 507 using the first image and the second image.

Alternatively, the calibration object may be selected 504 from one or more real-world objects, or parts thereof, which are visible in a region of the first image which corresponds to a field-of-view of the eye-facing camera.

As another alternative, the calibration object may be selected 504 based on a distortion of the calibration object in the second image as compared to the first image.

As a further alternative, the calibration object may be selected 504 based on a visual appearance of the calibration object.

As yet a further alternative, a previously selected calibration object among the one or more real-world objects may be selected 504 as the calibration object.

As yet a further alternative, method 500 may further comprise tracking 502 a motion of the display device using one or more motion sensors comprised in the display device, and estimating 503, based on the tracked motion of the display device, a duration of time during which the one or more real-world objects remain visible in the first image. The calibration object is selected 504 based on the estimated duration of time during which the calibration object remains visible in the first image.

As yet a further alternative, selecting 504 the calibration object may comprise identifying one or more real-world objects by matching visual features of the one or more real-world objects against information pertaining to visual features of real-world objects which is stored in a database, and selecting the calibration object based on information obtained from the database, which information indicates a respective suitability of the identified real-world objects, or parts thereof, as calibration object.

As yet a further alternative, selecting 504 the calibration object may comprise identifying, using a wireless-communications interface comprised in the display device, a communications device comprising a display among the one or more real-world objects, and selecting as the calibration object at least one of the display of the communications device and graphical content displayed thereon. Optionally, selecting 504 the calibration object may further comprise receiving a representation of the displayed graphical content from the communications device via the wireless-communications interface. Alternatively, selecting 504 the calibration object may further comprise transmitting an instruction to the communications device via the wireless-communications interface, to display the graphical content on the display of the communications device. Optionally, selecting 504 the calibration object may further comprise transmitting a representation of the graphical content to the communications device via the wireless-communications interface.

Optionally, the calibration object is selected 504 and the calibration transformation is derived 507 in response to calibration being triggered 501 by any one of: receiving from the user an instruction to initiate a calibration procedure, powering up the display device, detecting a misalignment of a displayed virtual object relative to the real-world scene, detecting that the user is different from a previous user of the display device, detecting that the display device has been displaced relative to at least one eye of the user, and detecting that any one of display 101, front-facing camera 102, and eye-facing camera 103, has been displaced relative to the display device.

Optionally, method 500 may further comprise, in response to selecting 504 the calibration object, adapting 505 one or more displayed virtual objects which overlap the selected calibration object as seen by the user.

Optionally, method 500 may further comprise, in response to selecting 504 the calibration object, notifying 506 the user that calibration is ongoing. Optionally, the user is notified 506 that calibration is ongoing by displaying a marker on the display to identify the selected calibration object to the user.

Optionally, method 500 may further comprise receiving 508 an instruction to display a virtual object, the instruction comprising a corresponding real-world position of the virtual object when being displayed to the user, calculating 509 a display position of the virtual object by applying the calibration transformation to the received real-world position, and displaying 510 the virtual object at the calculated display position on the display.

It will be appreciated that method 500 may comprise additional, or modified, steps in accordance with what is described throughout this disclosure. An embodiment of method 500 may be implemented as software, such as computer program 304, to be executed by a processing unit comprised in a head-mounted display device, whereby the display device becomes operative in accordance with embodiments of the invention described herein. Computer program 304 may be stored on a computer-readable storage medium such as memory 303, a Compact Disc (CD), a Digital Versatile Disc (DVD), a memory stick, or the like. Computer program 304 may also be carried by a data carrier signal. For instance, computer program 304 may be transferred to memory 303 over a communications network, such as the Internet, via wireless-communications interface 105.

The person skilled in the art realizes that the invention by no means is limited to the embodiments described above. On the contrary, many modifications and variations are possible within the scope of the appended claims.

What is claimed is:

1. A head-mounted display device configured to be worn by a user, the display device comprising:
    an at least partially see-through display;
    a front-facing camera configured to image a real-world scene viewed by the user through the display;
    one or more motion sensors configured to track motion of the head-mounted display device; and
    a processor configured to:
        select, as a calibration object, a real-world object that is currently visible in the imaged real-world scene and estimated, based on the tracked motion of the head-mounted display device, to remain visible to the front-facing camera for a duration sufficient to perform a calibration procedure; and
        initiate the calibration procedure using the calibration object, the calibration procedure comprising deriving a calibration transformation to be used by the processor for calculating display positions for displaying virtual objects in alignment with corresponding real-world objects seen by the user through the display.

2. The head-mounted display device of claim 1, wherein, for a case where the processor estimates that two or more real-world objects that are currently visible in the imaged real-world scene will remain visible to the front-facing camera for the duration sufficient to perform the calibration procedure, the processor is configured to select a more suitable one of the two or more real-world objects, according to one or more suitability characteristics.

3. The head-mounted display device of claim 2, wherein the one or more suitability characteristics comprise a contrast characteristic, and wherein the processor is configured to select a higher-contrast one, from among the two or more real-world objects.

4. The head-mounted display device of claim 2, wherein the one or more suitability characteristics comprise a geometry characteristic, and wherein the processor is configured to select a geometrically simpler one, from among the two or more real-world objects.

5. The head-mounted display device of claim 1, wherein the processor is configured to estimate that the real-world object will remain visible to the front-facing camera for the duration sufficient to perform the calibration procedure based at least in part on detecting that the real-world object is moving within the imaged real-world scene in a direction corresponding to the tracked motion of the head-mounted display device.

6. The head-mounted display device of claim 1, wherein, to display a particular virtual object corresponding to a particular real-world object that is visible in the imaged real-world scene, the processor is configured to calculate the display position of the virtual object on the at least partially see-through display by applying the calibration transformation to the real-world position of the particular real-world object.

7. The head-mounted display device of claim 1, wherein the processor is configured to use a selected portion of the real-world object for performing the calibration procedure.

8. A method performed by head-mounted display device configured to be worn by a user, the method comprising:
    selecting, as a calibration object, a real-world object that is currently visible in an imaged real-world scene captured by a front-facing camera of the head-mounted display device and corresponding to a view seen by the user of the head-mounted display device through an at least partially see-through display, and estimated, based on tracked motion of the head-mounted display device, to remain visible to the front-facing camera for a duration sufficient to perform a calibration procedure; and initiating the calibration procedure using the calibration object, the calibration procedure comprising deriving a calibration transformation to be used by a processor of the head-mounted display device for calculating display positions for displaying virtual objects in alignment with corresponding real-world objects seen by the user through the display.

9. The method of claim 8, wherein, for a case where the processor estimates that two or more real-world objects that are currently visible in the imaged real-world scene will remain visible to the front-facing camera for the duration sufficient to perform the calibration procedure, the method comprises selecting a more suitable one of the two or more real-world objects, according to one or more suitability characteristics.

10. The method of claim 9, wherein the one or more suitability characteristics comprise a contrast characteristic, and wherein method includes selecting a higher-contrast one, from among the two or more real-world objects.

11. The method of claim 9, wherein the one or more suitability characteristics comprise a geometry characteristic, and wherein the method includes selecting a geometrically simpler one, from among the two or more real-world objects.

12. The method of claim 8, wherein the method includes estimating that the real-world object will remain visible to the front-facing camera for the duration sufficient to perform the calibration procedure based at least in part on detecting that the real-world object is moving within the imaged real-world scene in a direction corresponding to the tracked motion of the head-mounted display device.

13. The method of claim 8, wherein, to display a particular virtual object corresponding to a particular real-world object that is visible in the imaged real-world scene, the method further comprises calculating the display position of the virtual object on the at least partially see-through display by applying the calibration transformation to the real-world position of the particular real-world object.

14. The method of claim 8, wherein the method includes using a selected portion of the real-world object for performing the calibration procedure.

* * * * *